United States Patent
Lee et al.

(10) Patent No.: US 8,597,727 B2
(45) Date of Patent: Dec. 3, 2013

(54) PHOTOALIGNMENT MATERIAL, DISPLAY SUBSTRATE HAVING AN ALIGNMENT LAYER FORMED USING THE SAME, AND TO A METHOD OF MANUFACTURING THE DISPLAY SUBSTRATE

(71) Applicant: Samsung Display Co., Ltd., Yongin (KR)

(72) Inventors: Jun-Woo Lee, Anyang-si (KR); Fusayuki Takeshita, Seoul (KR); Baek-Kyun Jeon, Yongin-si (KR); Tae-Sung Jung, Suwon-si (KR); Hoi-Lim Kim, Seoul (KR); Jeong-Hye Choi, Incheon (KR); Sung-Yi Kim, Gwangju-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

(21) Appl. No.: 13/647,752

(22) Filed: Oct. 9, 2012

(65) Prior Publication Data
US 2013/0029443 A1    Jan. 31, 2013

Related U.S. Application Data

(62) Division of application No. 12/408,261, filed on Mar. 20, 2009, now Pat. No. 8,304,038.

(30) Foreign Application Priority Data

May 21, 2008    (KR) .................................. 2008-46858

(51) Int. Cl.
*B05D 5/06*    (2006.01)

(52) U.S. Cl.
USPC ............ 427/162; 427/487; 427/508; 264/1.1; 264/1.27; 264/494; 428/1.1; 428/1.2; 349/123; 349/187; 438/30

(58) Field of Classification Search
USPC .................... 428/1.1, 1.2; 349/123, 124, 187; 445/58; 528/345; 427/525, 515, 161, 427/487, 508; 430/321; 524/111, 112, 113, 524/114, 173, 233, 359; 252/299.4; 264/1.1, 1.27, 494; 438/30
See application file for complete search history.

(56) References Cited

U.S. PATENT DOCUMENTS

2007/0003708 A1 *    1/2007    Shin .............................. 427/553
2009/0237603 A1 *    9/2009    Takeshita et al. ............. 349/123

FOREIGN PATENT DOCUMENTS

JP    2005242282 A    *    9/2005

*Primary Examiner* — Gwendolyn Blackwell
*Assistant Examiner* — Ruiyun Zhang
(74) *Attorney, Agent, or Firm* — F. Chau & Associates, LLC

(57) ABSTRACT

A photoalignment material includes an alignment polymer, a photoalignment additive including a compound represented by the following Chemical Formula 1 and an organic solvent.

<Chemical Formula 1>

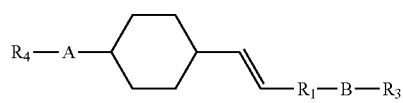

In Chemical Formula 1, $R_1$ represents a cyclic compound. A and B independently represent a single bond or $-(C_nH_{2n})-$.

"n" represents an integer in a range of 1 to 12. Each —CH$_2$— of A and/or B may be replaced with
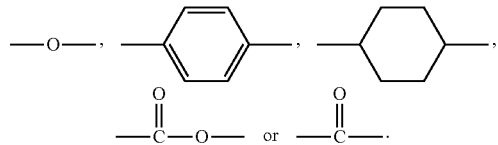 or 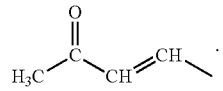.
R$_3$ represents an alkyl group having 1 to 12 carbon atoms, and each —CH$_2$— of A and/or B may be replaced with —O—. R$_4$ represents
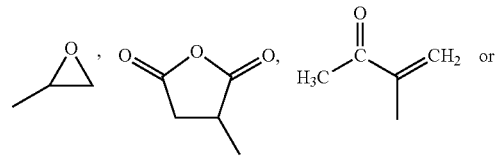
-continued
In Chemical Formula 1, each hydrogen atom excluding hydrogen atoms of R$_4$ may be replaced with chlorine (Cl) or fluorine (F).
11 Claims, 4 Drawing Sheets

PHOTOALIGNMENT MATERIAL, DISPLAY SUBSTRATE HAVING AN ALIGNMENT LAYER FORMED USING THE SAME, AND TO A METHOD OF MANUFACTURING THE DISPLAY SUBSTRATE

PRIORITY STATEMENT

This application is a divisional application of co-pending U.S. application Ser. No. 12/408,261 filed Mar. 20, 2009, which claims priority under 35 U.S.C. §119 to Korean Patent Application No. 2008-46858, filed on May 21, 2008, the disclosures of which are each hereby incorporated by reference herein in their entireties.

BACKGROUND OF THE INVENTION

1. Technical Field

The present disclosure relates to a photoalignment material, a display substrate having an alignment layer formed using the same, and to a method of manufacturing the display substrate. More particularly, the present disclosure relates to a photoalignment material used in a process for manufacturing an alignment layer of a liquid crystal display (LCD) apparatus, a display substrate having an alignment layer formed using the same, and to a method of manufacturing the display substrate.

2. Description of the Related Art

Generally, a liquid crystal display (LCD) panel includes a display substrate having a thin-film transistor (TFT) as a switching element driving a pixel, an opposite substrate facing the display substrate, and a liquid crystal layer interposed between the display substrate and the opposite substrate. The LCD panel displays an image using the light transmittance of liquid crystal that changes according to voltage.

An alignment layer is formed on interior portions of each of the display substrate and the opposite substrate, because it may be difficult to obtain an ideal liquid crystal molecular arrangement by simply disposing the liquid crystal material between the display substrate and the opposite substrate. The alignment layer may be formed by spreading an alignment raw material using a printing roller of an alignment layer printing apparatus on a base substrate and a rubbing process. For example, the alignment raw material may be a solution including a polyimide polymer.

Static electricity may be generated by rubbing using a rubbing cloth in the rubbing process to form the alignment layer, and thus the display substrate may be damaged by the static electricity. Moreover, the display substrate may be readily polluted in the rubbing process and stained with spots and stains, so that display quality may be decreased. To prevent the static electricity and improve the display quality, a photoalignment process has been developed, wherein the process may include spreading a photoalignment material on the base substrate and photodegrading, photoisomerizing or photopolymerizing the photoalignment material using light.

An alignment layer formed by a method using photoisomerization may have low alignment stability as the orientation of the alignment layer may not be maintained for a long period of time. Furthermore, the alignment layer formed by a method using photoisomerization may have a low photosensitivity compared to an alignment layer formed by a method using photodegradation or photopolymerization. Thus, developing a photoalignment material having a photoreactive portion may be required. However, developing a new photoalignment material may involve high costs. Furthermore, optimizing characteristics of an alignment layer, for example, electro-optical characteristics and manufacturing characteristics, may be difficult.

SUMMARY OF THE INVENTION

Exemplary embodiments of the present invention may provide a photoalignment material capable of improving the orientation of an alignment film without an alignment polymer having a photoreactive portion.

Exemplary embodiments of the present invention may provide a display substrate having an alignment layer formed using the same.

Exemplary embodiments of the present invention may provide a method of manufacturing the display substrate.

In accordance with an exemplary embodiment of the present invention, a photoalignment material is provided. The photoalignment material includes an alignment polymer, a photoalignment additive including a compound represented by the following Chemical Formula 1 and an organic solvent.

<Chemical Formula 1>

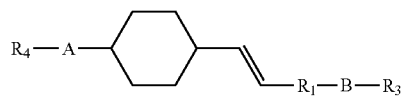

In Chemical Formula 1, $R_1$ represents a cyclic compound. A and B independently represent a single bond or $-(C_nH_{2n})-$. "n" represents an integer in a range of 1 to 12. Each $-CH_2-$ of A and/or B may be replaced with

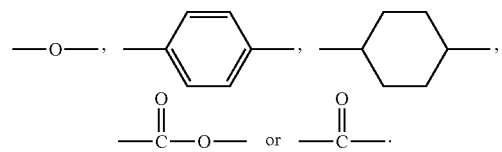

$R_3$ represents an alkyl group having 1 to 12 carbon atoms, and each $-CH_2-$ of A and/or B may be replaced with $-O-$. $R_4$ represents

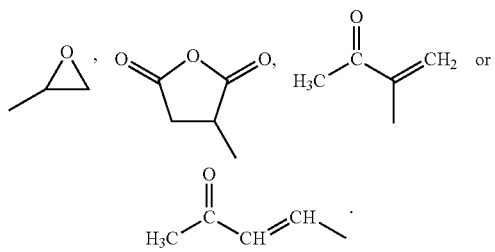

In Chemical Formula 1, and each hydrogen atom excluding hydrogen atoms of $R_4$ may be replaced with chlorine (Cl) or fluorine (F).

Examples of the cyclic compound may include but are not limited to cyclohexane, dioxane, tetrahydrofuran, benzene, naphthalene, chroman and the like.

The alignment polymer may have a main chain including, for example, a polyimide compound, a polyamic acid compound, a polysiloxane compound, a polyvinyl cinnamate compound, a polyacrylate compound, a polymethyl methacrylate compound and the like.

For example, the content of the alignment polymer may be about 0.5% to about 15% by weight, and the content of the photoalignment additive may be about 0.01% to about 6% by weight, and the content of the organic solvent may be about 84% to about 99% by weight.

In accordance with an exemplary embodiment of the present invention, a display substrate is provided. The display substrate includes a switching element formed on a base substrate and electrically connected to a gate line and a data line crossing the gate line, a pixel electrode electrically connected to the switching element, and an alignment layer formed on the base substrate having the pixel electrode and including a photoreactive portion being represented by the following Chemical Formula 1, <Chemical Formula 1A>

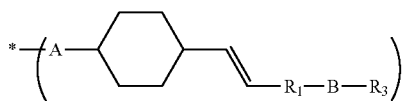

In Chemical Formula 1A, $R_1$ represents cyclohexane, benzene, chroman, naphthalene, tetrahydrofuran or dioxane, and each of A and B represents a single bond or —$(C_nH_{2n})$—, and "n" represents an integer in a range of 1 to 12, and each —$CH_2$— of A and/or B is replaceable with

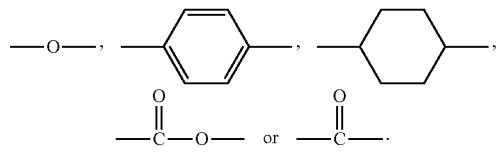

$R_3$ represents an alkyl group having 1 to 12 carbon atoms, and each —$CH_2$— of A and/or B is replaceable with —O—, and each hydrogen atom is replaceable with chlorine (Cl) or fluorine (F).

In accordance with an exemplary embodiment of the present invention, a display substrate is provided. The display substrate includes a plurality of color filters formed on a base substrate, a common electrode layer formed on the color filters, and an alignment layer formed on the common electrode layer and including a photoreactive portion represented by the following Chemical Formula 1A, <Chemical Formula 1A>

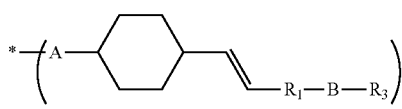

In Chemical Formula 1A, $R_1$ represents cyclohexane, benzene, chroman, naphthalene, tetrahydrofuran or dioxane, and each of A and B represents a single bond or —$(C_nH_{2n})$—, and "n" represents an integer in a range of 1 to 12, and each —$CH_2$— of A and/or B is replaceable with

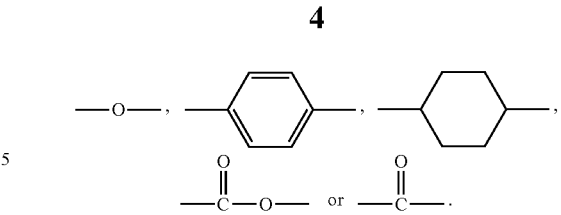

$R_3$ represents an alkyl group having 1 to 12 carbon atoms, and each —$CH_2$— of A and/or B is replaceable with —O—, and each hydrogen atom is replaceable with chlorine (Cl) or fluorine (F).

In accordance with another exemplary embodiment of the present invention, a method of manufacturing a display substrate is provided. In the method, a pixel unit is formed on a base substrate. A photoalignment material is coated on the base substrate having the pixel unit, the photoalignment material including an alignment polymer, a photoalignment additive including a chemical compound represented by the following Chemical Formula 1 and an organic solvent.

<Chemical Formula 1>

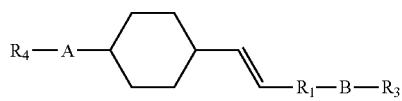

In Chemical Formula 1, $R_1$ represents a cyclic compound, A and B independently represent a single bond or —$(C_nH_{2n})$—, and "n" represents an integer in a range of 1 to 12, and each —$CH_2$— of A and/or B is replaceable with

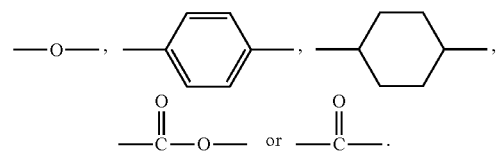

$R_3$ represents an alkyl group having 1 to 12 carbon atoms, and each —$CH_2$— of A and/or B is replaceable with —O—, and $R_4$ represents

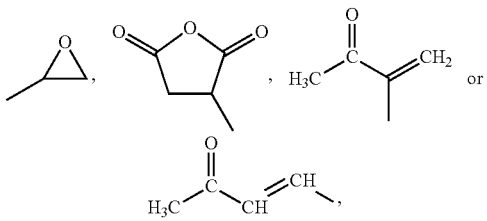

and each hydrogen atom excluding hydrogen atoms of $R_4$ is replaceable with chlorine (Cl) or fluorine (F). A preliminary layer is formed by reacting the alignment polymer and the photoalignment additive and phase-separating a portion of the photoalignment additive adjacent to a surface of the preliminary layer. Light is irradiated onto the base substrate having the preliminary layer to react the photoalignment additive to form an alignment layer having an orientation.

Examples of the cyclic compound may include but are not limited to cyclohexane, dioxane, tetrahydrofuran, benzene, naphthalene, chroman and the like.

A photoalignment material according to an exemplary embodiment of the present invention includes a photoalignment additive having a photoreactive portion. Thus, an alignment layer having an orientation may be formed without an alignment polymer having a photoreactive portion. As a result, the costs for developing a novel alignment polymer may be reduced, and the alignment layer may be formed without contact with, for example, a rubbing fabric. Therefore, the image quality, reliability and productivity of a display device may be improved.

BRIEF DESCRIPTION OF THE DRAWINGS

Exemplary embodiments of the present invention can be understood in more detail from the following description taken in conjunction with the accompanying drawings wherein.

DETAILED DESCRIPTION OF THE EXEMPLARY EMBODIMENTS OF THE INVENTION

Figure 1:
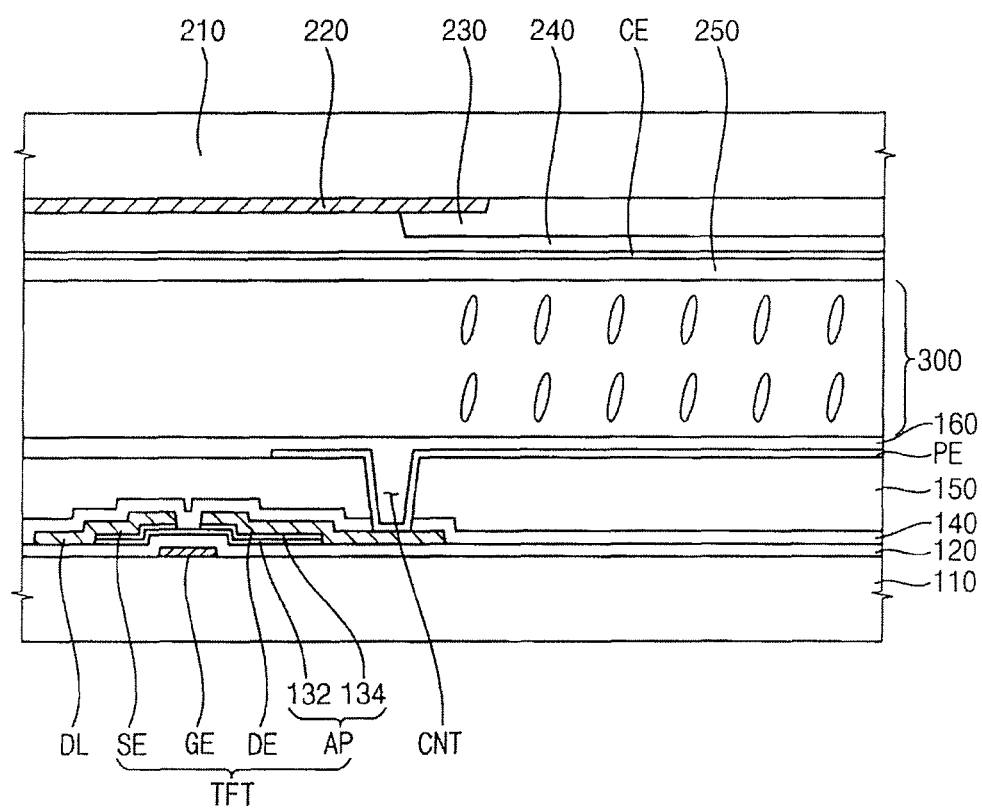
FIG. 1 is a cross-sectional view illustrating a display panel according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Photoalignment Material

A photoalignment material according to an exemplary embodiment of the present invention may include, for example, an alignment polymer, a photoalignment additive and an organic solvent.

Alignment Polymer

The alignment polymer may serve to form a film having a predetermined thickness on a substrate, and may include a repeating unit. Examples of the alignment polymer may include but are not limited to conventional alignment polymers for a vertical alignment mode or for a twisted nematic mode, etc.

Particularly, examples of the alignment polymer may include but are not limited to a polyimide compound, a polyamic acid compound, a polysiloxane compound, a polyvinyl cinnamate compound, a polyacrylate compound, a polymethyl methacrylate compound and the like. These can be used alone or in a combination thereof.

For example, a diamine compound and an acid anhydride may react with each other to prepare a polyamic acid compound. The polyamic acid compound may be partially imidized to prepare the polyimide compound.

The alignment polymer may contain a photoreactive branch group having a photoreactive portion. The photoreactive branch group is coupled to a main chain including, for example, a polyimide compound, a polyamic acid compound, a polysiloxane compound, a polyvinyl cinnamate compound, a polyacrylate compound, a polymethyl methacrylate compound and the like. The photoreactive portion may include, for example,

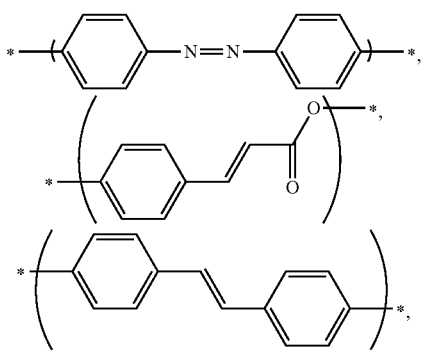

etc.

When the monodisperse polystyrene-reduced weight-average molecular weight of the alignment polymer, which is measured by gel permeation chromatography (GPC), is less than about 1,000, the polymeric characteristics of the alignment polymer may be deteriorated. Thus, characteristics of the alignment polymer may be deteriorated. When the monodisperse polystyrene-reduced weight-average molecular weight of the alignment polymer is greater than about 1,000,000, solid deposits of the alignment polymer may be readily generated at a low temperature. Thus, printing the alignment polymer may be difficult. Therefore, the weight-average molecular weight of the alignment polymer may preferably be, for example, about 1,000 to 1,000,000.

Photoalignment Additive

The photoalignment additive includes a compound represented by the following Chemical Formula 1.

<Chemical Formula 1>

$$R_4-A-\underset{R_1-B-R_3}{\bigcirc}$$

In Chemical Formula 1, $R_1$ represents a cyclic compound. Examples of the cyclic compound may include but are not limited to cyclohexane, dioxane, tetrahydrofuran, benzene, naphthalene, chroman and the like. The cyclic compound has a double bond between carbon atoms that may serve as a photoreactive portion of the photoalignment additive. The photoreactive portion may be isomerized by light.

In Chemical Formula 1, A and B independently represent a single bond or $—(C_nH_{2n})—$. "n" represents an integer in a range of 1 to 12. Each $—CH_2—$ of A and/or B may be replaced with

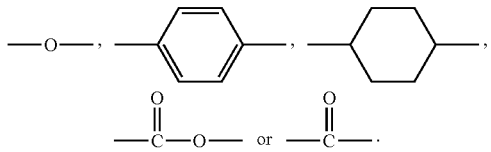

In Chemical Formula 1, $R_3$ represents an alkyl group having 1 to 12 carbon atoms, and each $—CH_2—$ of A and/or B may be replaced with $—O—$. $R_3$ may serve as a vertical embodying portion of the photoalignment additive. A liquid crystal molecule may be vertically aligned by a polar difference between the vertical embodying portion and the liquid crystal molecule.

In Chemical Formula 1, $R_4$ represents

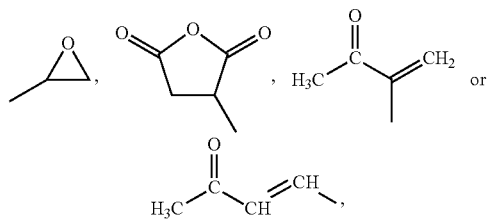

When a substrate having the photoalignment material is heated, $R_4$ may chemically react with the alignment polymer to be coupled to the alignment polymer. Particularly, $R_4$ may serve as a thermally reactive portion of the photoalignment additive. $R_4$ has a carbon-carbon bond and/or a carbon-oxygen bond, which are relatively weak. Thus, the carbon-carbon bond and/or the carbon-oxygen bond may be readily broken by heat, and then $R_4$ may be readily coupled to a main chain and/or a branch group of the alignment polymer.

In Chemical Formula 1, each hydrogen atom excluding hydrogen atoms of $R_4$ may be replaced with chlorine (Cl) or fluorine (F).

For example, the photoalignment additive may include compounds represented by the following Chemical Formulas 2, 3, 4 and 5. For example, a carbon-oxygen bond of an epoxy group in Chemical Formula 2 may be broken by heat to be coupled to a main chain of the alignment polymer.

<Chemical Formula 2>

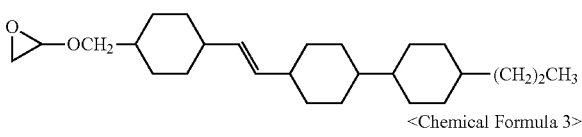

<Chemical Formula 3>

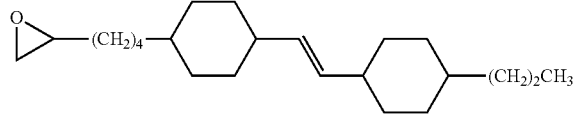

<Chemical Formula 4>

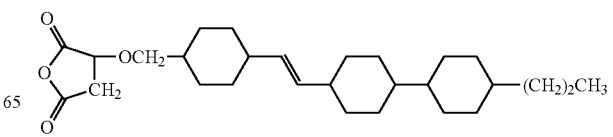

<Chemical Formula 5>

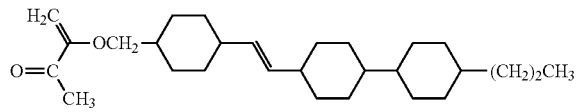

<Chemical Formula 2>

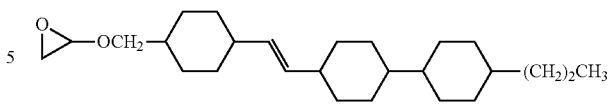

<Chemical Formula 6>

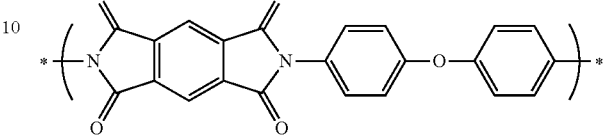

Organic Solvent

Examples of the organic solvent may include but are not limited to chlorobenzene, N-methylpyrrolidone, dimethylsulfoxide, dimethylformamide, toluene, chloroform, γ-butyrolactone, methyl cellosolve, butyl cellosolve, butyl carbitol, tetrahydrofuran, etc. These can be used alone or in a combination thereof.

The alignment material may include about 1% to about 15% by weight of a solid component based on the total weight of the alignment material and an organic solvent in which the solid component is dissolved. The solid component includes the alignment polymer and the photoalignment additive. When the content of the solid component is less than about 1% by weight, forming a film on a substrate may be difficult. When the content of the solid component is greater than about 15% by weight, the solid component may not be fully dissolved by the organic solvent thereby causing deposits of the solid component to be generated. Furthermore, uniformly coating the photoalignment material on a substrate may be difficult. Thus, the content of the solid component may preferably be, for example, about 1% to about 15% by weight, and more preferably about 3% to about 8% by weight.

When the content of the photoalignment additive is less than about 2% by weight based on the total weight of the solid component of the photoalignment material, the reactivity of the photoalignment material may be reduced. When the content of the photoalignment additive is greater than about 40% by weight based on the total weight of the solid component of the photoalignment material, the characteristics of a film formed from the photoalignment material may be deteriorated. For example, when the content of the photoalignment additive is excessively increased, the alignment characteristics of the film may be increased, but the electro-optical characteristics and/or manufacturing characteristics of the film may be deteriorated. Thus, the content of the photoalignment additive may preferably be, for example, about 2% to about 40% by weight based on the total weight of the solid component of the photoalignment material.

Based on the above, a photoalignment material according to an exemplary embodiment of the present invention may preferably include, for example, about 0.5% to about 15% by weight of an alignment polymer, about 0.01% to about 6% of a photoalignment additive and about 84% to about 99% of an organic solvent.

EXAMPLE 1

About 10% by weight of Kapton-H (trade name, manufactured by Dupont, U.S.A.), prepared by reacting 4,4'-diaminodiphenylether with pyromellitic dianhydride in chlorobenzene and containing a repeating unit represented by the following Chemical Formula 6, about 3% by weight of a compound represented by the following Chemical Formula 2 as a photoalignment additive and about 87% by weight of an organic solvent were mixed with each other to prepare a photoalignment material. The organic solvent included about 40% by weight of γ-butyrolactone, about 30% by weight of N-methylpyrrolidone and about 30% by weight of butyl cellosolve based on the total weight of the organic solvent.

Evaluation of an Alignment Layer

The photoalignment material of Example 1 was coated on a 17-inch display substrate, and then prebaked at about 60° C., and then cured at about 200° C. for about 10 minutes. Thereafter, ultraviolet (UV) light of about 1 J/cm² was irradiated onto the substrate in an anti-parallel direction by using a UV light exposure device (manufactured by USHIO, Japan). The UV light being linearly polarized at about 40° when a direction perpendicular to a surface of the substrate is considered to be about 0°. Liquid crystal for vertical alignment (VA) mode, which was manufactured by Merck, was provided to the substrate to prepare a liquid crystal display (LCD) panel.

According to experiments for evaluating the LCD panel, liquid crystal molecules of the LCD panel were inclined by the alignment layer to have a pretilt angle of about 89°. Furthermore, the display panel displayed a relatively clear image without stains. Furthermore, linear afterimages or surface afterimages did not appear on the screen of the LCD panel after a checker flag pattern had been displayed by the LCD panel at about 50° C. for about 24 hours.

Hereinafter, a display panel having a display substrate and a method of manufacturing a display panel, according to exemplary embodiments of the present invention will be described more fully with reference to the accompanying drawings. Particularly, the display panel having the display substrate will be described with reference to FIG. 1, and the method of manufacturing a display panel will be described with reference to FIGS. 2, 3, 4, 5 and 6.

Display Substrate

FIG. 1 is a cross-sectional view illustrating a display panel according to an exemplary embodiment of the present invention.

Referring to FIG. 1, a display panel includes an array substrate 100, an opposing substrate 200 and a liquid crystal layer 300.

An array substrate 100 includes a gate line, a data line DL crossing the gate line, a switching element TFT electrically connected to the gate line and the date line DL, a pixel electrode PE and a first alignment layer 160, which are formed on a first base substrate 110. The array substrate 100 may further include a gate insulation layer 120, a passivation layer 140 and an organic insulation layer 150, which are formed on the first base substrate 110.

The switching element TFT includes a gate electrode GE connected to the gate line, a source electrode SE connected to the data line DL and a drain electrode DE spaced apart from the source electrode SE. The pixel electrode PE is electrically connected to the switching element TFT through a contact hole CNT exposing a portion of the drain electrode DE.

The first alignment layer 160 has a photoreactive portion coupled to an alignment polymer and represented by the following Chemical Formula 1A.

<Chemical Formula 1A>

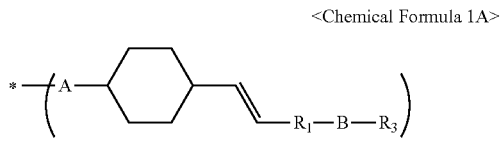

In Chemical Formula 1A, $R_1$ represents a cyclic compound. Examples of the cyclic compound may include but are not limited to cyclohexane, dioxane, tetrahydrofuran, benzene, naphthalene, chroman and the like. A and B independently represent a single bond or —$(C_nH_{2n})$—. "n" represents an integer in a range of 1 to 12. Each —$CH_2$— of A and/or B may be replaced with

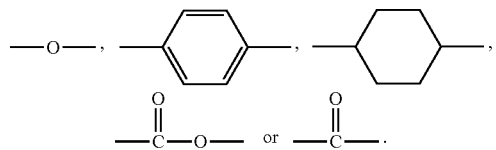

$R_3$ represents an alkyl group having 1 to 12 carbon atoms, and each —$CH_2$— of A and/or B may be replaced with —O—. In Chemical Formula 1A, each hydrogen atom may be replaced with chlorine (Cl) or fluorine (F).

The photoreactive portion may be disposed adjacent to a surface of the first alignment layer 160. When the photoreactive portion is exposed to light, the photoreactive portion may form an orientation on the surface of the first alignment layer 160. The first alignment layer 160 may be formed by coating a photoalignment material on the first base substrate 110 having the organic insulation layer 150 and heating the photoalignment material. The photoalignment material includes an alignment polymer, a photoalignment additive having the photoreactive portion represented by Chemical Formula 1 and an organic solvent. When the photoalignment material coated on the first base substrate 110 is heated, the photoalignment additive is coupled to the alignment polymer so that the first alignment layer 160 has the photoreactive portion represented by Chemical Formula 1. $R_3$ may serve as a vertical embodying portion of the photoalignment additive on a surface of the first alignment layer 160. The photoalignment additive may include the compound represented by Chemical Formula 2.

The first alignment layer 160 is formed from the alignment polymer of the photoalignment material. The photoalignment additive is coupled to the alignment polymer so that the surface of the first alignment layer 160 has an orientation. Thus, even if the alignment polymer does not have reactivity, the surface of the first alignment layer 160 may have an orientation due to the photoalignment additive. Accordingly, the costs for developing a novel alignment polymer may be reduced. Furthermore, the first alignment layer 160 is formed without contact with, for example, a rubbing fabric so that the manufacturing reliability of the first alignment layer 160 may be improved. Thus, as a result, the reliability and productivity of processes for manufacturing a display device may be improved.

The opposing substrate 200 includes a light-blocking pattern 220, a color filter 230, an overcoating layer 240, a common electrode layer CE and a second alignment layer 250, which are formed on a second base substrate 210.

The light-blocking pattern 220 is formed on the second base substrate 210, and blocks light having passed through the liquid crystal layer 300 and being incident onto the opposing substrate 210. The light-blocking pattern 220 may be formed on the second base substrate 210 overlapping with the gate line, the data line DL and the switching element TFT.

The color filter 230 may be formed in an opening formed by the light-blocking pattern 220. The color filter 230 may be formed on the second base substrate overlapping with the pixel electrode PE.

The overcoating layer 240 is formed on the second base substrate 210 having the light-blocking pattern 220 and the color filter 230. The overcoating layer 240 may prevent impurities of the light-blocking pattern 220 and the color filter 230 from contaminating the common electrode layer CE, and may planarize the opposing substrate 200.

The common electrode layer CE is formed on the second base substrate 210 having the overcoating layer 240.

The second alignment layer 250 is formed on the second base substrate 210 having the common electrode layer CE. The second alignment layer 250 may be formed from substantially the same material as the above-described photoalignment material. Thus, any further explanation will be omitted.

Method of Manufacturing an Array Substrate

Figure 2:
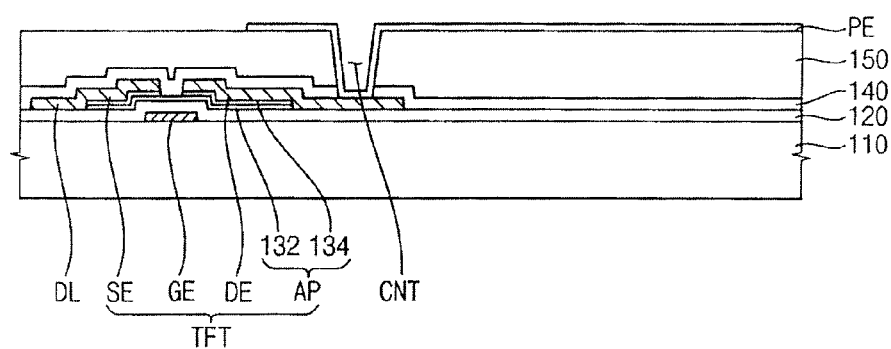
FIGS. 2 and 3 are cross-sectional views illustrating a method of manufacturing the array substrate illustrated in FIG. 1.
Figure 3:
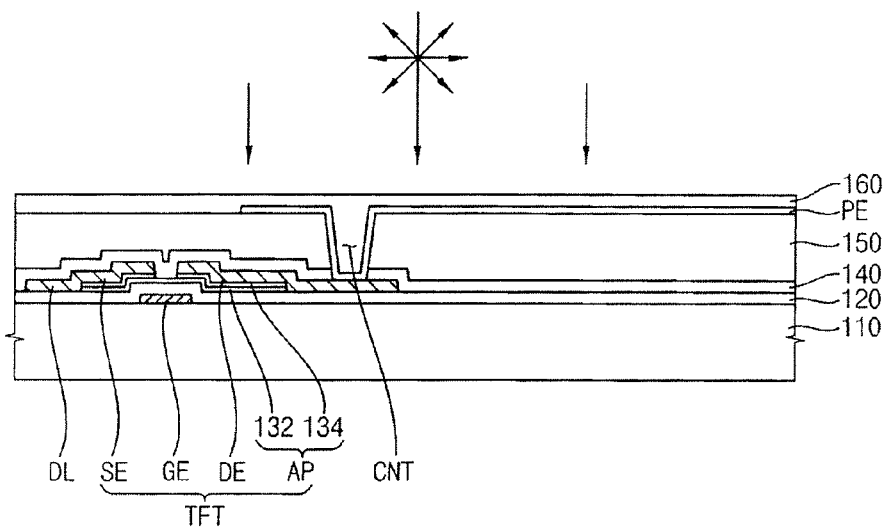

FIGS. 2 and 3 are cross-sectional views illustrating a method of manufacturing the array substrate illustrated in FIG. 1. Hereinafter, substantially the same components as the components illustrated in FIG. 1 will be explained by using the same names and the same reference numerals.

Referring to FIG. 2, a pixel unit is formed on a first base substrate 110. The pixel unit includes a gate line, a data line DL, a switching element TFT electrically connected to the gate line and the data line DL, a gate insulation layer 120, a passivation layer 140, an organic insulation layer 150 and a pixel electrode PE.

For example, a gate metal layer is formed on the first base substrate 110, and then patterned through a photolithography process to form the gate line and a gate electrode GE connected to the gate line. The gate insulation layer 120 and an active pattern AP are formed on the first base substrate 110 having the gate line and the gate electrode GE. For example, the active pattern AP may include a semiconductor layer 132 and an ohmic contact layer 134 formed on the semiconductor layer 132. The semiconductor layer 132 may include, for example, amorphous silicon, and the ohmic contact layer 134 may include, for example, amorphous silicon, into which n-type impurities are implanted. A data metal layer is formed on the first base substrate 110 having the active pattern AP, and then patterned through a photolithography process to form the data line DL, a source electrode SE connected to the data line DL and a drain electrode DE spaced apart from the source electrode SE. The gate electrode GE, the active pattern AP, the source electrode SE and the drain electrode DE may define the switching element TFT. The passivation layer 140 and the organic insulation layer 150 are sequentially formed on the first base substrate 110 having the data line DL, the source electrode SE and the drain electrode DE. The passivation layer 140 and the organic insulation layer 150, which overlaps with the drain electrode DE, are partially removed to form a contact hole CNT exposing a portion of the drain electrode DE. The pixel electrode PE is formed on the first base substrate 110 having the contact hole CNT formed through the passivation layer 140 and the organic insulation layer 150. The pixel electrode PE is electrically connected to the switching element TFT through the contact hole CNT.

Figure 4:
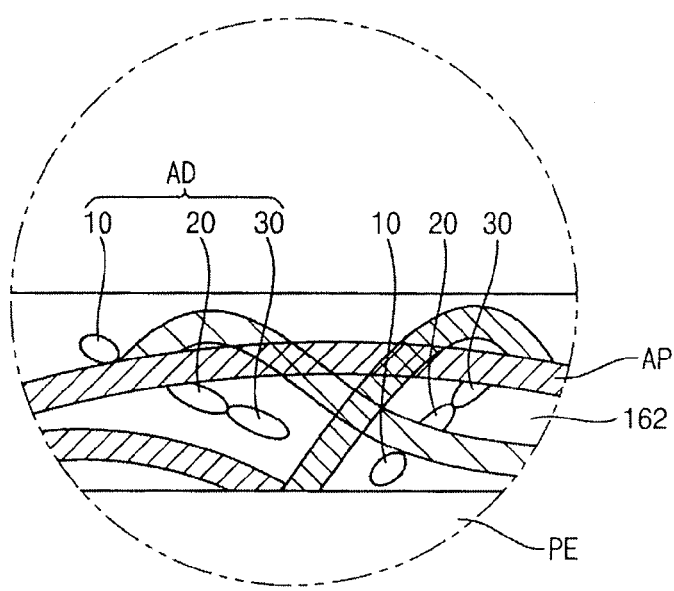
FIGS. 4 and 5 are enlarged cross-sectional views illustrating a process of forming the alignment layer of FIG. 3.

Referring to FIG. 3, a photoalignment material is coated on the first base substrate 110 having the pixel electrode PE to form a first preliminary layer 162 illustrated in FIG. 4.

The photoalignment material includes the alignment polymer, the photoalignment additive including a compound represented by the following Chemical Formula 1 and an organic solvent.

<Chemical Formula 1>

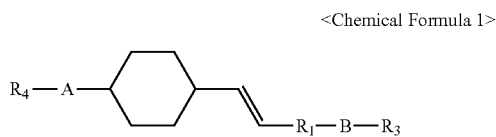

In Chemical Formula 1, $R_1$ represents a cyclic compound. A and B independently represent a single bond or —$(C_nH_{2n})$—. "n" represents an integer in a range of 1 to 12. Each —$CH_2$— of A and/or B may be replaced with

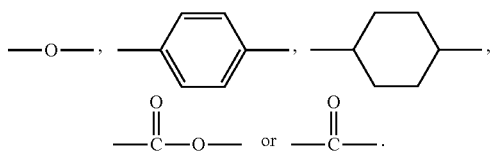

$R_3$ represents an alkyl group having 1 to 12 carbon atoms, and each —$CH_2$— of A and/or B may be replaced with —O—. $R_4$ represents

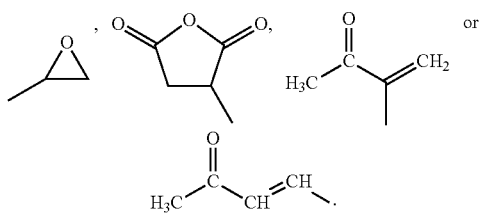

In Chemical Formula 1, each hydrogen atom excluding hydrogen atoms of $R_4$ may be replaced with chlorine (Cl) or fluorine (F).

Examples of the cyclic compound may include but are not limited to cyclohexane, dioxane, tetrahydrofuran, benzene, naphthalene, chroman and the like.

The photoalignment material may be substantially the same as the above-described photoalignment material. Thus, any further explanation will be omitted.

The first preliminary layer 162 is prebaked to remove a portion of the organic solvent from the first base substrate 110. The first preliminary layer 162 is shaped by the alignment polymer, and includes the alignment polymer and the photoalignment additive mixed with the alignment polymer. For example, the first preliminary layer 162 may be prebaked at about 50° C. to about 70° C.

Thereafter, the first base substrate 110 having the first preliminary layer 162 is heated so that the first preliminary layer 162 is hard-baked. The first preliminary layer 162 may be hard-baked, for example, at about 180° C. to about 220° C. When the first preliminary layer 162 is heated at a high temperature, the alignment polymer chemically reacts with the photoalignment additive in the first preliminary layer 162 to form a second preliminary layer 164 illustrated in FIG. 5. For example, a portion of the photoalignment additive is phase-separated from the alignment polymer in an area adjacent to the surface of the first preliminary layer 162 to form the second preliminary layer 164. The portion of the photoalignment additive forms the second preliminary layer 164, and a remainder of the photoalignment additive is chemically coupled to the alignment polymer.

A polarized light is irradiated onto the first base substrate 110 having the second preliminary layer 164. The portion of the photoalignment additive phase-separated from the alignment polymer is oriented by the polarized light to form a predetermined angle with respect to the surface of the first base substrate 110 so that a first alignment layer 160 is formed. For example, UV light may be used for the polarized light, and the intensity of the UV light may be about 0.5 J/cm² to about 2 J/cm².

Referring to FIG. 4, a process of forming the first preliminary layer 162 will be described in detail. Furthermore, a process of forming the second preliminary layer 164 will be described in detail with reference to FIG. 5.

Figure 5:
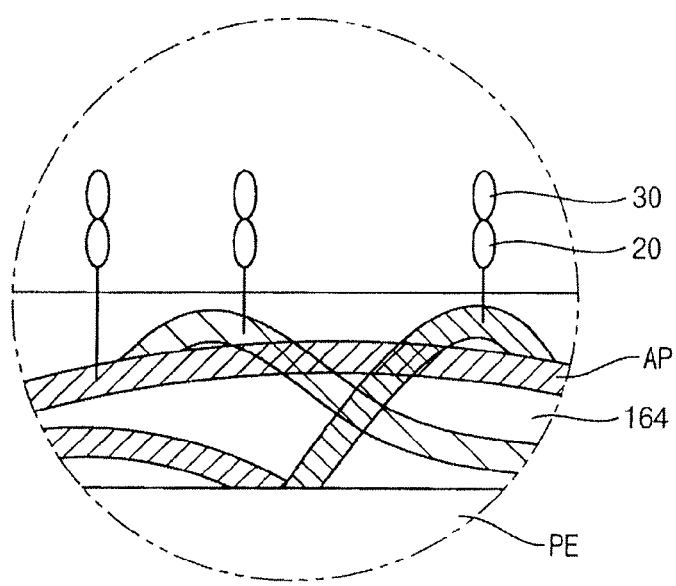

FIGS. 4 and 5 are enlarged cross-sectional views illustrating a process of forming the alignment layer of FIG. 3. In FIGS. 4 and 5, a photoalignment additive is indicated by "AD", and an alignment polymer is indicated by "AP". Furthermore, a thermally reactive portion, a photoreactive portion and a vertical embodying portion of the photoalignment additive are respectively indicated by 10, 20 and 30.

Referring to FIG. 4, the first preliminary layer 162 is formed on the first base substrate 110 having the pixel electrode PE. The first preliminary layer 162 is shaped by the alignment polymer AP, and the photoalignment additive AD is mixed with the alignment polymer AP in the first preliminary layer 162. For example, the alignment polymer AP is chemically separated from the photoalignment additive AD, and is physically mixed with the photoalignment additive AD in the first preliminary layer 162.

Referring to FIG. 5, the first preliminary layer 162 is hard-baked to form the second preliminary layer 164. When the first preliminary layer 162 is hard-baked, a chemical bond of the thermally reactive portion 10 is broken. Then, the thermally reactive portion 10 is coupled to the alignment polymer AP. Thus, the alignment polymer AP is chemically coupled to the thermally reactive portion 10 of the photoalignment additive AD in the second preliminary layer 164. Furthermore, the photoreactive portion 20 and the vertical embodying portion 30 are phase-separated in an area adjacent to a surface of the second preliminary layer 164. Thus, even if the alignment polymer does not include a photoreactive portion, the alignment polymer may be photo-oriented by using the photoreactive portion 20 and the vertical embodying portion 30 of the photoalignment additive. As a result, the costs for developing a novel alignment polymer may be reduced thereby improving the reliability and productivity of processes for manufacturing a display device.

When a photoalignment material according to an exemplary embodiment of the present invention includes an alignment polymer having a photoreactive portion and a photoalignment additive having a photoreactive portion, the orientation of an alignment layer formed from the photoalignment material may be improved when compared with a photoalignment material only including an alignment polymer having a photoreactive portion. Furthermore, the photoalignment additive may not deteriorate physical and electrical characteristics of the alignment polymer. Thus, non-contact alignment is possible while maintaining physical and electrical characteristics of the alignment layer, which are optimized by the alignment polymer. Therefore, the reliability of the alignment layer may be improved.

Method of Manufacturing an Opposing Substrate

Figure 6:
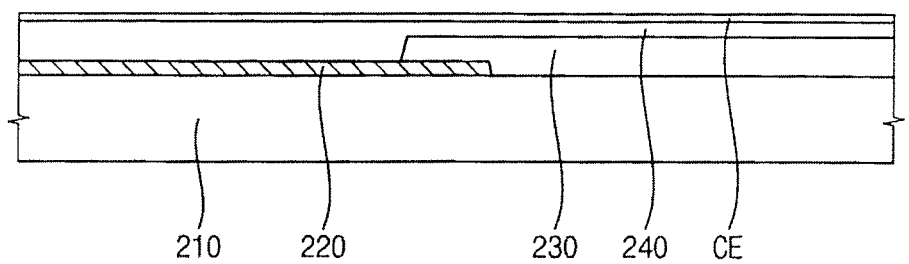
FIGS. 6 and 7 are cross-sectional views illustrating a method of manufacturing the opposing substrate illustrated in FIG. 1.
Figure 7:
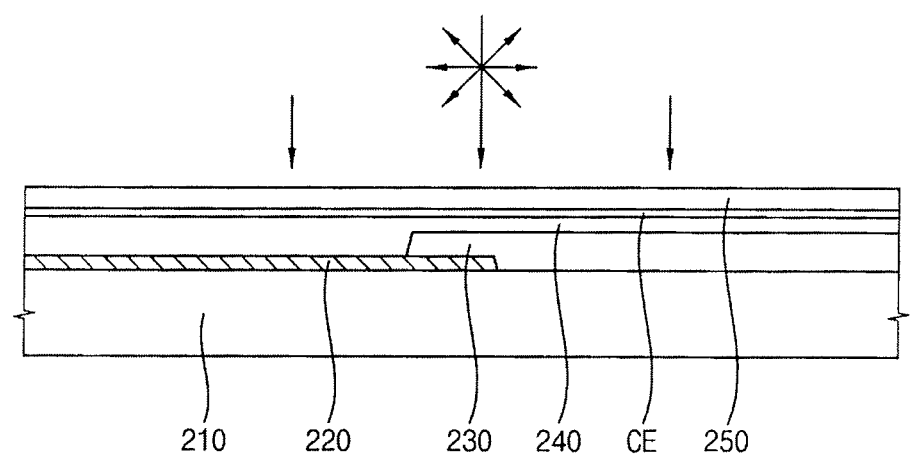

FIGS. 6 and 7 are cross-sectional views illustrating a method of manufacturing the opposing substrate illustrated in FIG. 1. Hereinafter, substantially the same components as the components illustrated in FIG. 1 will be explained by using the same names and the same reference numerals.

Referring to FIG. 6, a pixel unit is formed on a second base substrate 210. The pixel unit includes a light-blocking pattern 220, a color filter 230, an overcoating layer 240 and a common electrode layer CE.

For example, the light-blocking pattern 220 may be formed by, for example, forming a metal layer and patterning the metal layer through a photolithography process. Alternatively, the light-blocking pattern 220 may be formed by, for example, spraying an ink on the second base substrate 210. The color filter 230 is formed on the second base substrate 210 having the light-blocking pattern 220. The color filter 230 may be formed by, for example, coating a color photoresist material on the second base substrate 210, exposing the color photoresist material to light and developing the color photoresist material. Alternatively, the color filter 230 may be formed by, for example, spraying a color ink on the second base substrate 210. The overcoating layer 240 and the common electrode layer CE are sequentially formed on the second base substrate 210 having the light-blocking pattern 220 and the color filter 230. For example, the overcoating layer may include an acryl resin. Examples of a material that may be used for the common electrode layer CE may include but are not limited to indium zinc oxide (IZO), indium tin oxide (ITO) and the like.

Referring to FIG. 7, a second alignment layer 250 is formed on the second base substrate 210 having the common electrode layer CE. A process of forming the second alignment layer 250 is substantially the same as the process of forming the first alignment layer 160. Thus, any further explanation will be omitted.

A photoalignment material according to an exemplary embodiment of the present invention may include a photoalignment additive having a photoreactive portion. Thus, even if an alignment polymer does not include a photoreactive portion, a surface of an alignment layer may be photo-oriented through reaction of the photoreactive portion of the photoalignment additive. As a result, the costs for developing a novel alignment polymer may be reduced, and the alignment layer may be formed without contact with, for example, a rubbing fabric. Therefore, the image quality, reliability and productivity of a display device may be improved.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A method of manufacturing a display substrate, the method comprising:
    forming a pixel unit on a base substrate; and
    coating a photoalignment material on the base substrate having the pixel unit, the photoalignment material including an alignment polymer, a photoalignment additive including a chemical compound represented by the following Chemical Formula 1 and an organic solvent;

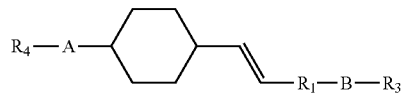

<Chemical Formula 1> forming a preliminary layer by reacting the alignment polymer and the photoalignment additive and phase-separating a portion of the photoalignment additive adjacent to a surface of the preliminary layer; and irradiating light onto the base substrate having the preliminary layer to react the photoalignment additive to form an alignment layer having an orientation, wherein $R_1$ represents a cyclic compound, A and B independently represent a single bond or —$(C_nH_{2n})$—, and "n" represents an integer in a range of 1 to 12, and each —$CH_2$— of A and/or B is replaceable with

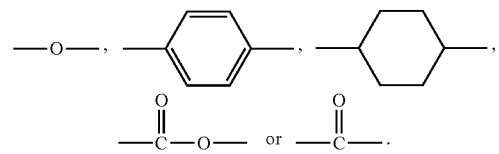

$R_3$ represents an alkyl group having 1 to 12 carbon atoms, and each —$CH_2$— of A and/or B is replaceable with —O—, and $R_4$ represents

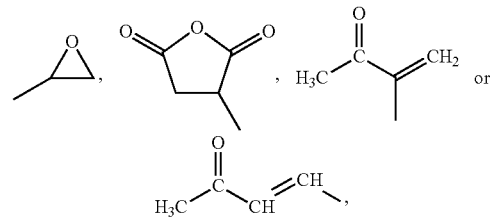

and each hydrogen atom excluding hydrogen atoms of $R_4$ is replaceable with chlorine (Cl) or fluorine (F).

2. The method of claim 1, wherein the cyclic compound includes one selected from the group consisting of cyclohexane, benzene, chroman, naphthalene, tetrahydrofuran and dioxane.

3. The method of claim 1, wherein the alignment polymer has a main chain including at least one selected from the group consisting of a polyimide compound, a polyamic acid compound, a polysiloxane compound, a polyvinyl cinnamate compound, a polyacrylate compound, and a polymethyl methacrylate compound.

4. The method of claim 3, wherein the alignment polymer has a photoreactive branch group coupled to the main chain and capable of having an orientation due to light.

5. The method of claim 1, wherein the forming of the pixel unit comprises:
    forming a switching element on the base substrate, wherein the switching element is electrically connected to a gate line and a data line; and
    forming a pixel electrode electrically connected to the switching element.

6. The method of claim 1, wherein the forming of the pixel unit comprises:
   forming a plurality of color filters on the base substrate; and
   forming a common electrode layer on the base substrate having the color filters.

7. The method of claim 1, further comprising:
   prebaking the preliminary layer at a temperature of about 50° C. to about 70° C. prior to irradiating the preliminary layer.

8. The method of claim 7, further comprising:
   heating the preliminary layer such that the alignment polymer chemically reacts with the photoalignment additive, subsequent to prebaking the preliminary layer and prior to irradiating the preliminary layer.

9. The method of claim 8, wherein the heating of the preliminary layer includes hard-baking the preliminary layer at a temperature from about 180° to about 220°.

10. The method of claim 1, wherein ultra-violet (UV) light is used for irradiating the base substrate having the preliminary layer.

11. The method of claim 10, wherein the intensity of the UV light is about 0.5 $J/cm^2$ to about 2 $J/cm^2$.

* * * * *